United States Patent
Hsu

(10) Patent No.: US 6,476,980 B2
(45) Date of Patent: Nov. 5, 2002

(54) METHOD OF MANUFACTURING PROTECTIVE LENS FOR DISPLAY

(75) Inventor: Che-Yuan Hsu, Tu-Chen (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 10/141,386

(22) Filed: May 7, 2002

(65) Prior Publication Data
US 2002/0130428 A1 Sep. 19, 2002

Related U.S. Application Data

(62) Division of application No. 09/738,903, filed on Dec. 13, 2000.

(30) Foreign Application Priority Data
Jun. 22, 2000 (TW) .......................................... 089112324

(51) Int. Cl.⁷ .......................... G02B 9/00; G02B 27/00; B05D 5/06
(52) U.S. Cl. ........................ 359/738; 359/613; 427/164; 427/165
(58) Field of Search ............................... 359/613, 738; 427/164, 165

(56) References Cited

U.S. PATENT DOCUMENTS

| | | | | |
|---|---|---|---|---|
| 4,452,516 A | * | 6/1984 | Salia-Munoz | 351/145 |
| 4,766,023 A | * | 8/1988 | Lu | 428/120 |
| 4,788,094 A | * | 11/1988 | Morita et al. | 428/136 |
| 5,204,160 A | * | 4/1993 | Rouser | 428/167 |
| 5,254,388 A | * | 10/1993 | Melby et al. | 428/120 |
| 5,330,799 A | * | 7/1994 | Sandor et al. | 427/510 |
| 5,554,432 A | * | 9/1996 | Sandor et al. | 428/157 |

* cited by examiner

Primary Examiner—Georgia Epps
Assistant Examiner—David N. Spector
(74) Attorney, Agent, or Firm—Wei Te Chung

(57) ABSTRACT

A method for manufacturing a protective lens (10) for a display is disclosed. The protective lens includes a transparent glass substrate (12) and a piece of filtering film (14) attached to the glass substrate. A plurality of parallel ink stripes (16) being formed on a surface of the film is distributed symmetrically from middle to opposite sides of the film in a predetermined pattern. The method includes: providing a mold (20) having a plurality of recesses (24) formed by etching a surface of the mold; filling the recesses of the mold with ink; positioning an elastically deformable body (50) on the mold or attaching the ink in the recesses to the elastically deformable body; positioning the elastically deformable body on a membrane (60) to transfer the ink to the membrane, thus forming the film; attaching the film to a surface of the glass substrate.

16 Claims, 7 Drawing Sheets

METHOD OF MANUFACTURING PROTECTIVE LENS FOR DISPLAY

CROSS-REFERENCE TO RELATED APPLICATION

This is a division of application Ser. No. 09/738,903, filed Dec. 13, 2000.

BACKGROUND OF THE INVENTION

1. Field of the Invention

The present invention relates to a method of manufacturing a protective lens for a display, and particularly to a method of manufacturing a protective lens for a display that can prevent light from messages from being emitted outside of a predetermined central arc.

2. The Related Art

An electronic device, such as a mobile phone or a pager, usually has a display for showing text or image messages. The messages are displayed using a light source built into the electronic device. A lens for protection covers the display. Conventionally, the lens is a transparent member allowing a user to read messages. The lens may also be formed with laser images to improve the visual effect, as disclosed in Taiwan patent application No. 87220130.

With the growing demand for personal privacy, it is becoming more desirable to have a lens that prevents people from seeing messages shown on a display except from a relatively narrow arc from which the user views the message. FIGS. 1 and 2 of the attached drawings disclose one such known lens 90. The lens 90 includes a flat, transparent glass plate 92 and a filtering film 94 adhering to an inner surface of the glass plate 92. The filtering film 94 is printed with a series of equally spaced ink stripes 98 to block light from being transmitted through the lens 90 except in a narrow central arc, as illustrated in FIG. 1. Thus a message shown on the display cannot be seen from the sides outside of this arc.

A method of manufacturing the lens 90 will be explained with reference to FIG. 2. The method comprises the following steps: (1) directly printing ink stripes 98 on a film substrate 96; (2) cutting the film substrate 96 to form the filtering film 94; and (3) attaching the filtering film 94 to the glass plate 92.

However, this direct printing method is only adapted to a flat lens, because the ink stripes 98 are distributed in an equally spaced fashion. In addition, the equally spaced distribution of ink stripes is not suitable for a curved or arcuate lens because the distribution of distances between ink stripes must change for different locations on the arc of the lens to block light outside the same viewing arc as used with the flat lens.

SUMMARY OF THE INVENTION

Therefore, an object of the present invention is to provide a method of manufacturing a protective lens for a display that can prevent light from messages from being emitted outside of a predetermined central arc.

Another object of the present invention is to provide a method for mass-producing display protective lens having different non-flat configurations.

To achieve the above objects, a method for manufacturing a protective lens for a display is disclosed in the present invention. The protective lens includes a transparent glass substrate and a filtering film attached to an inner surface of the glass substrate. A plurality of parallel ink stripes are formed on a surface of the film and are distributed symmetrically from middle to opposite sides according to a predetermined pattern. The method includes the steps of: (1) providing a mold having a plurality of recesses formed by etching a surface of the mold; (2) filling the recesses of the mold with ink; (3) pressing an elastically deformable body against the mold, thereby attaching the ink in the recesses to the elastically deformable body; (4) pressing the elastically deformable body against a membrane, thereby transferring the ink to the membrane, thus forming a filtering film; (5) attaching the filtering film to a surface of the glass substrate.

These and additional objects, features and advantages of the present invention will become apparent after reading the following detailed description of a preferred embodiment of the invention taken in conjunction with the appended drawings.

DETAILED DESCRIPTION OF THE INVENTION

A protective lens in accordance with the present invention is attached to and covers a display of an electronic device (not shown), such as a mobile phone. The display normally shows text or image messages. The messages are displayed using a light source built into the electronic device. The light from the light source is selectively blocked to be visible only in a predetermined angular range, thereby preventing people other than the user from observing the messages.

Figure 1:
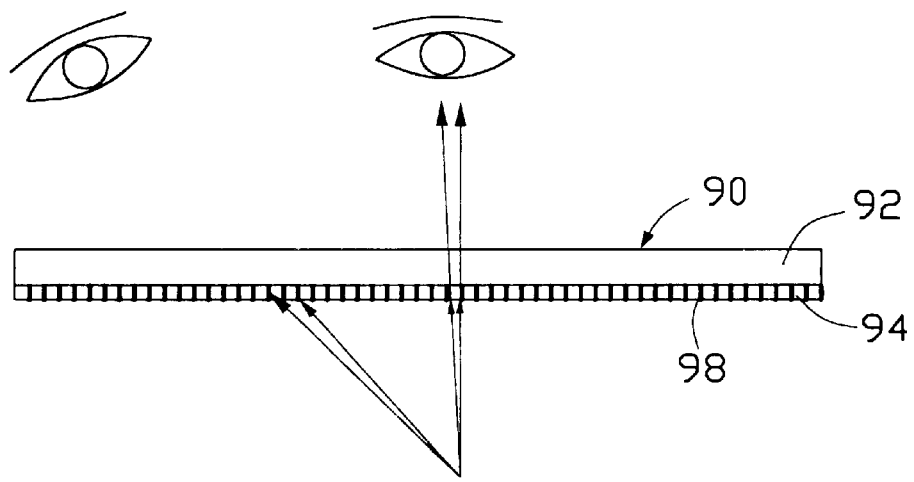
FIG. 1 is a schematic view showing a conventional protective lens.
Figure 2:
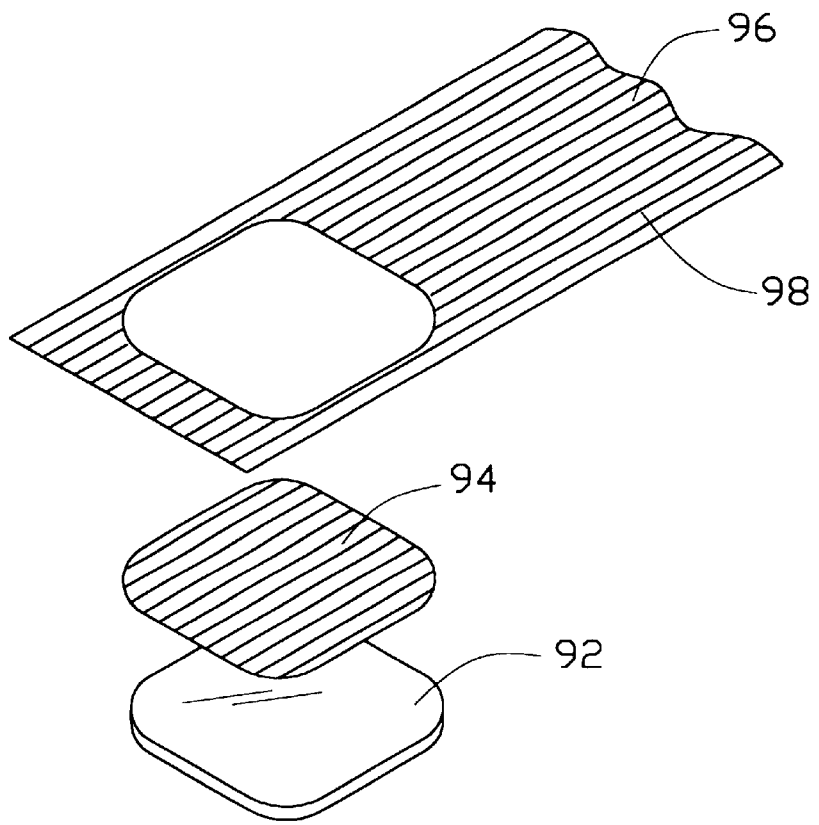
FIG. 2 schematically shows how to manufacture the conventional protective lens of FIG. 1.
Figure 3:
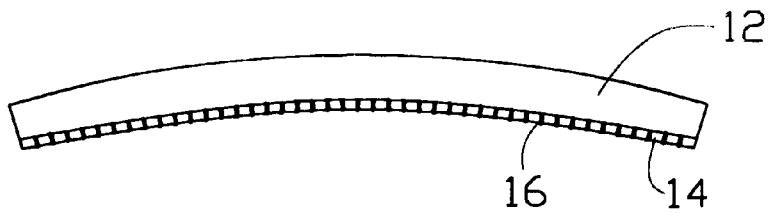
FIG. 3 is a sectional view of a protective lens in accordance with the present invention.
Figure 4:
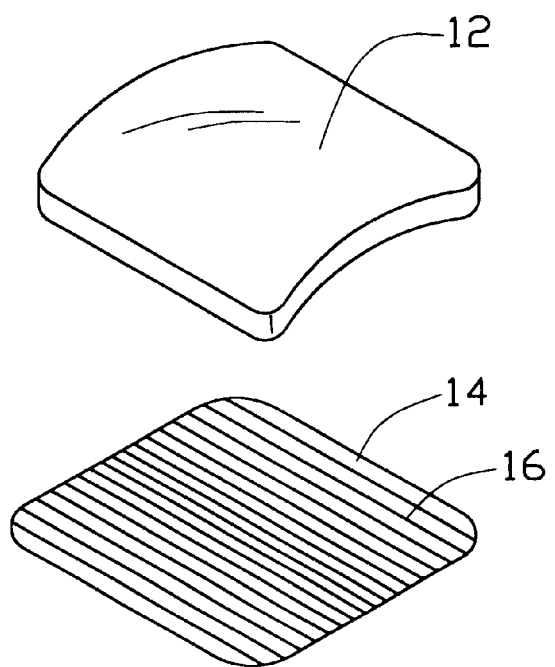
FIG. 4 is an exploded view of the protective lens of FIG. 3 comprising a transparent glass substrate and a filtering film.

Referring to FIGS. 3 and 4, a protective lens of the present invention, generally designated by reference numeral 10, comprises a transparent glass substrate 12 and a filtering film 14. The glass substrate 12 is appropriately shaped to match the configuration of the electronic device. The filtering film 14 is similarly shaped to match an inner contour of the glass substrate 12. The film 14 is attached to an inner surface of the glass substrate 12 by any suitable known means. The filtering film 14 has a plurality of ink stripes 16 spaced at unequal intervals. The intervals between the stripes 16 are arranged in accordance with a predetermined pattern and are distributed symmetrically from middle to opposite sides. With this pattern of stripes 16, the intervals between stripes 16 at different locations along the arc of the glass substrate 12 changes so that light from a message shown on the display of the electronic device is blocked except in a narrow range viewed by the user. Therefore, the message can only be clearly seen from a particular, central range, making it difficult for bystanders to see the message.

If desired, an additional filtering film 14 may also be attached to an outer surface of the protective lens 10, but the intervals of the stripes 16 thereon must be correspondingly changed.

With reference to FIGS. 5–12, a process for making the lens 10 in accordance with the present invention will now be described.

Figure 5:
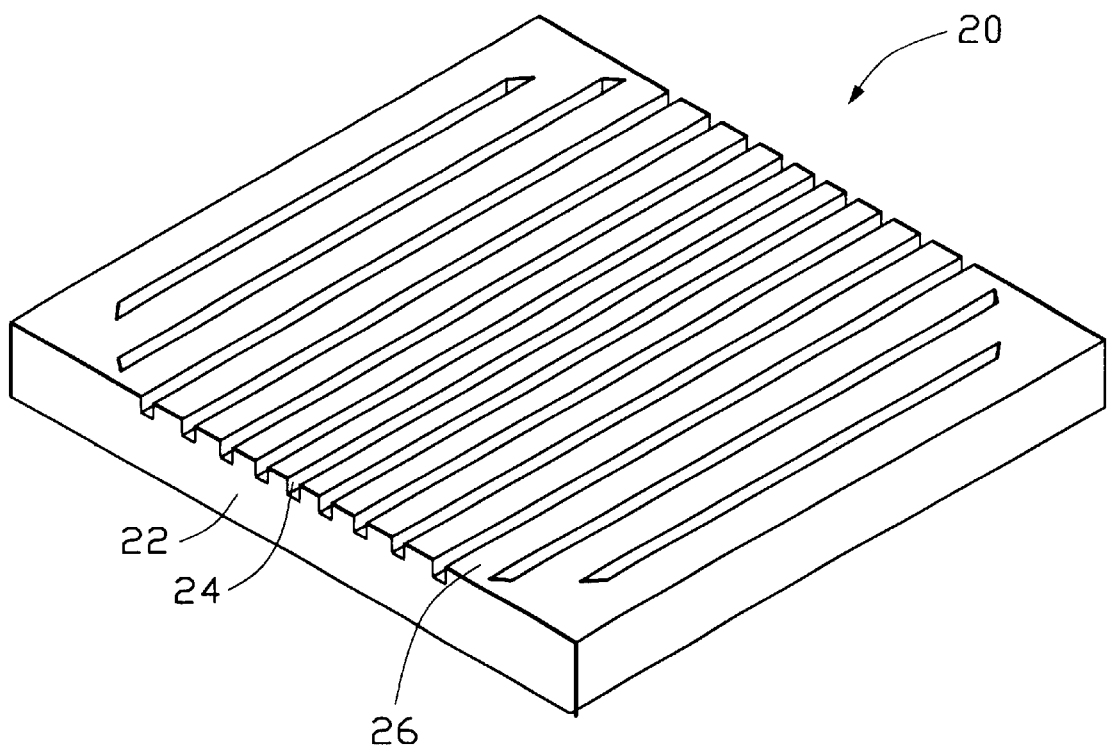
FIGS. 5–12 depict procedural steps in manufacturing the protective lens in accordance with the present invention.

In FIG. 5, a mold 20 for making the film 14 is formed by etching a metal plate 22, such as a steel plate, in an area comparable in size to the filtering film 14 to form a plurality of parallel recesses 24 therein. The pattern of intervals between the recesses 24 corresponds to the intervals between the ink stripes 16 of the filtering film 14. A surface of the mold 20 on which the recesses 24 are formed serves as a printing surface 26.

Figure 6:
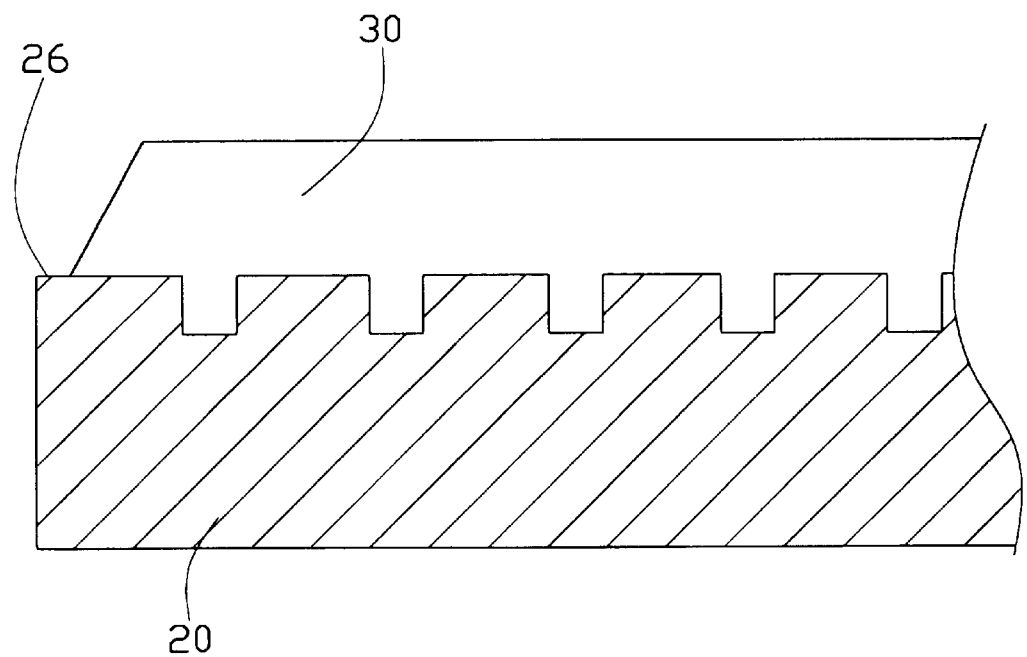

In FIG. 6, the printing surface 26 is flooded with ink 30. The ink 30 flows into and fills the recesses 24.

Figure 7:
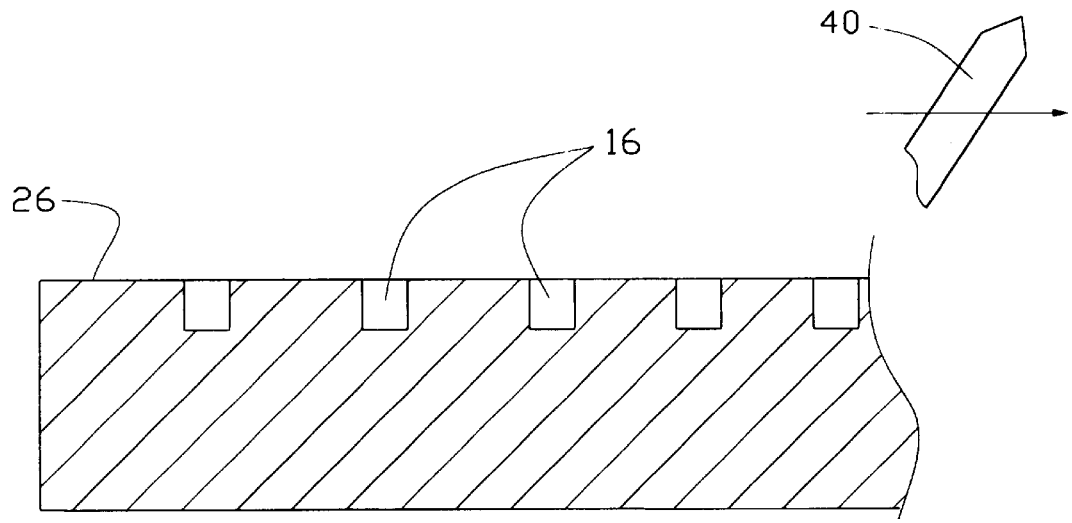

In FIG. 7, a blade 40 scraping over the printing surface 26 is used to remove excess ink 30.

Figure 8:
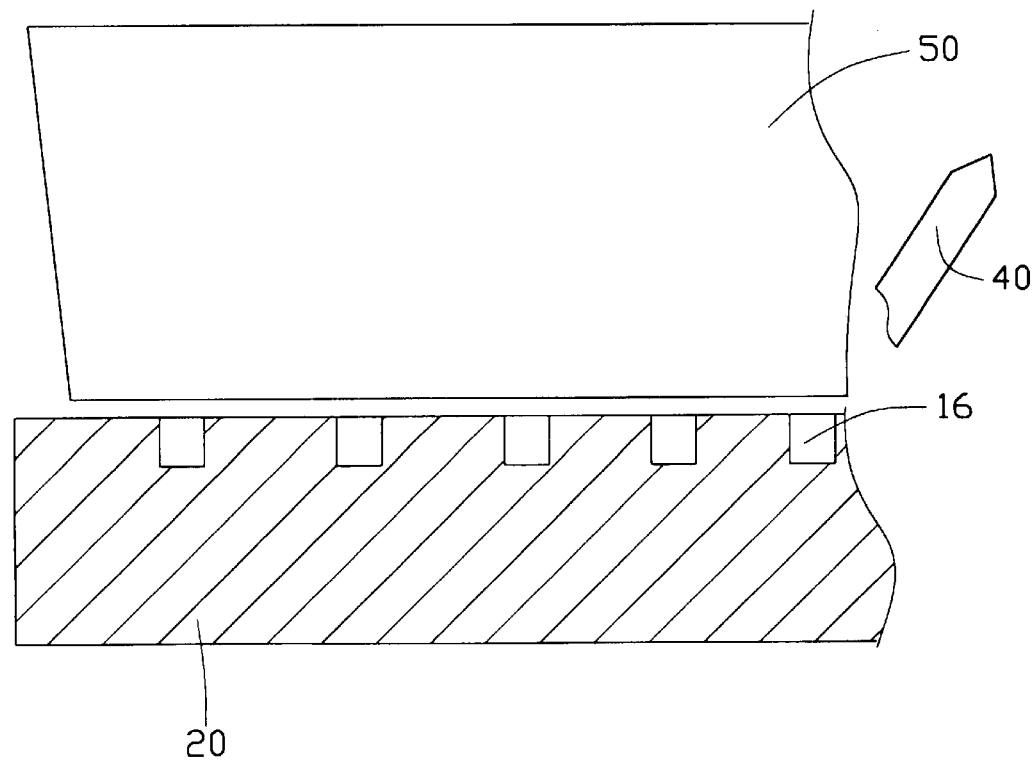

In FIG. 8, an elastically deformable body 50 is placed on the printing surface 26 and pressed thereagainst, whereby the ink retained in the recesses 24 is attached to a surface of the elastically deformable body 50, forming a pattern of ink stripes 16 thereon.

Figure 9:
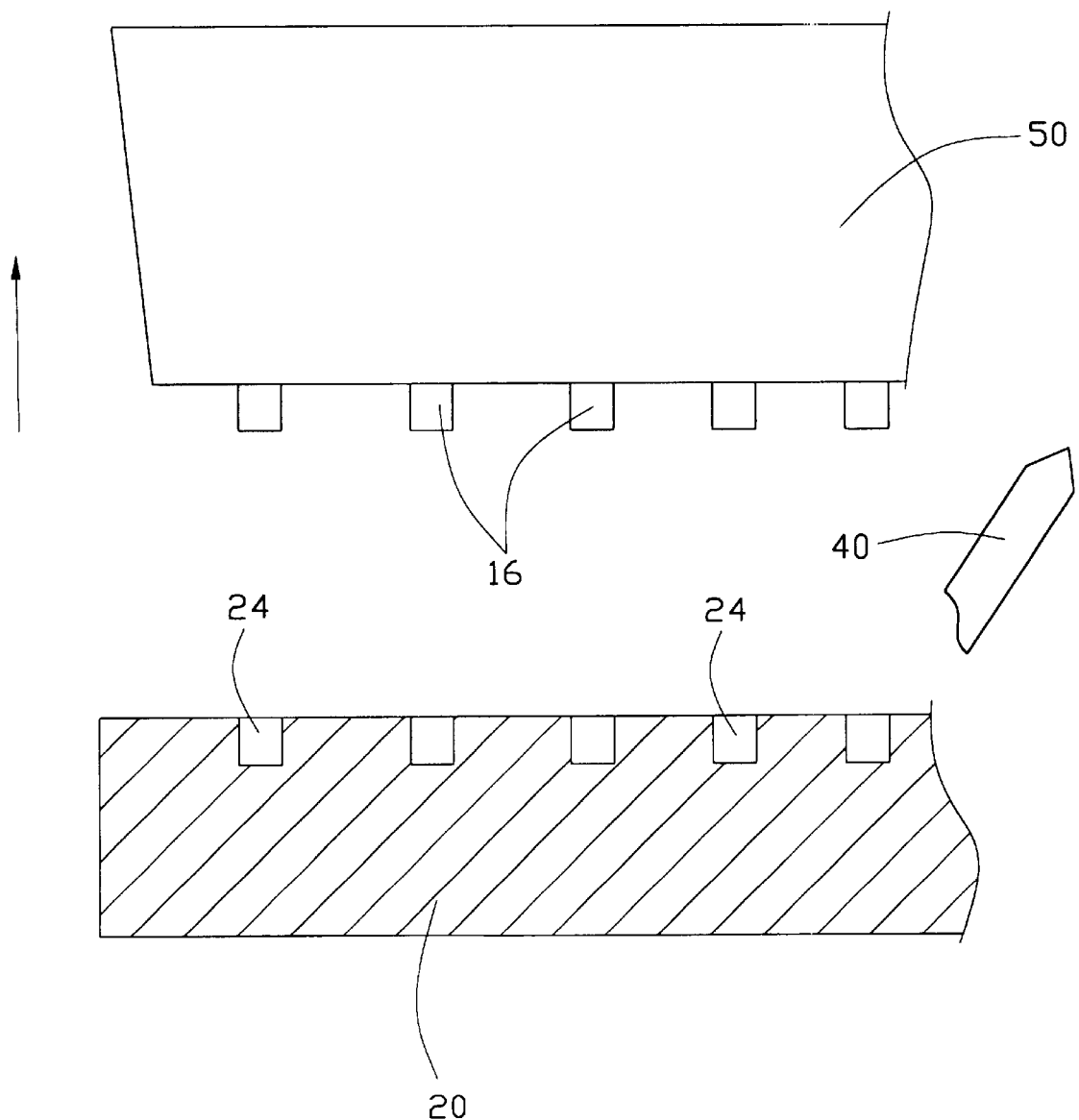

In FIG. 9, the elastically deformable body 50 is raised above the mold 20, lifting the ink stripes 16 from the recesses 24.

Figure 10:
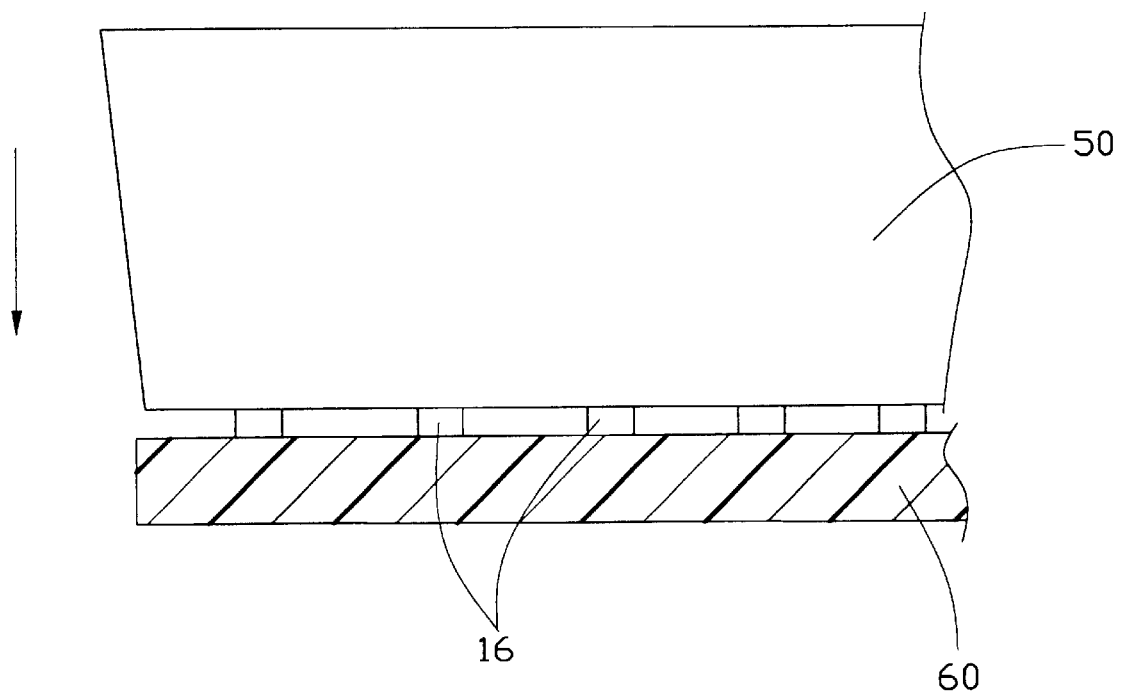

In FIG. 10, the elastically deformable body 50 with the ink stripes 16 adhered thereto, is positioned on a piece of membrane 60 that has been cut to the shape of the glass substrate 12 by stamping. The elastically deformable body 50 is now pressed against the membrane 60 to transfer the ink stripes 16 to the membrane 60.

Figure 11:
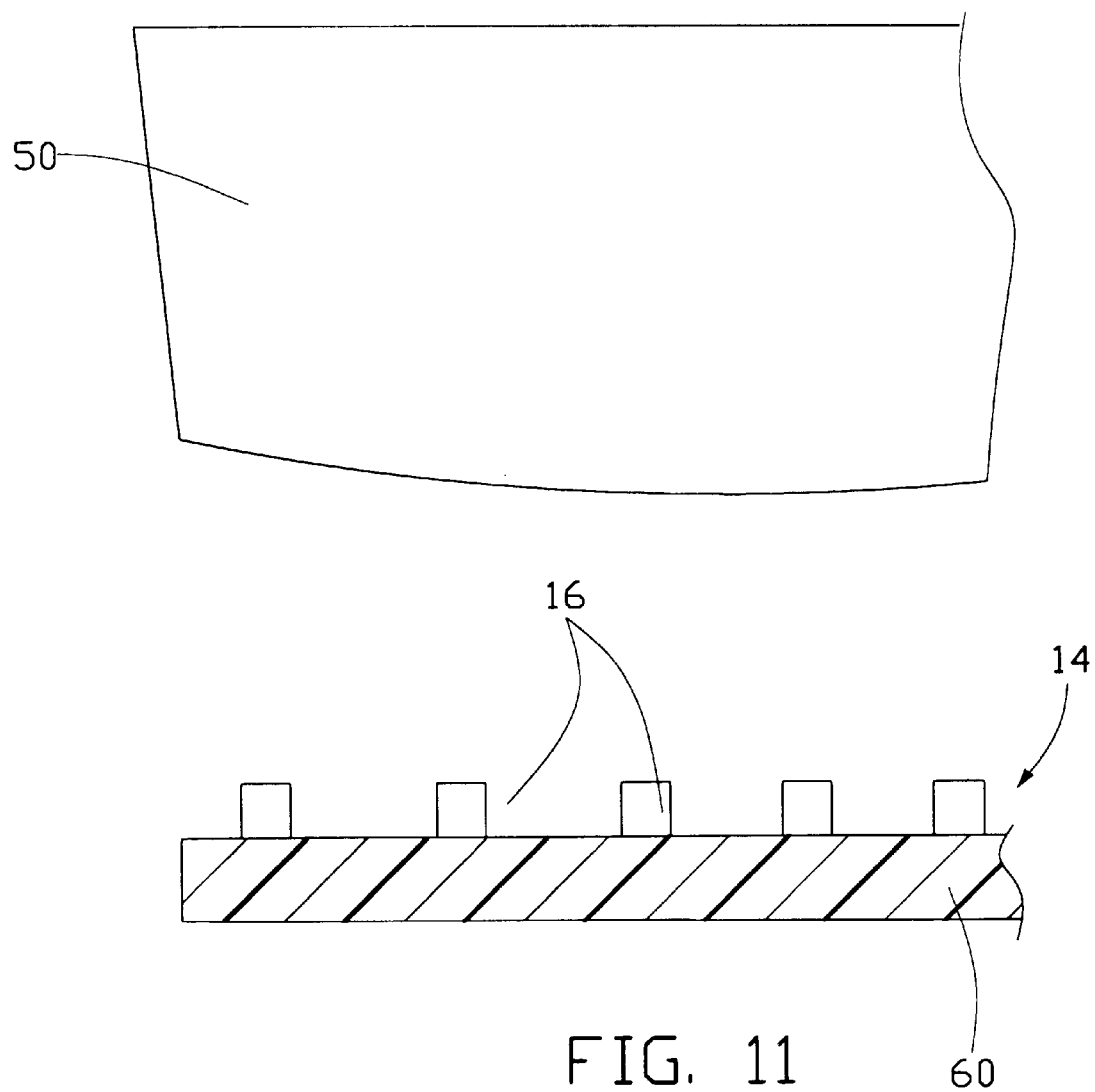

In FIG. 11, the elastically deformable body 50 is removed, with the ink stripes 16 remaining adhered to the membrane 60, whereby the filtering film 14 is completely formed.

Figure 12:
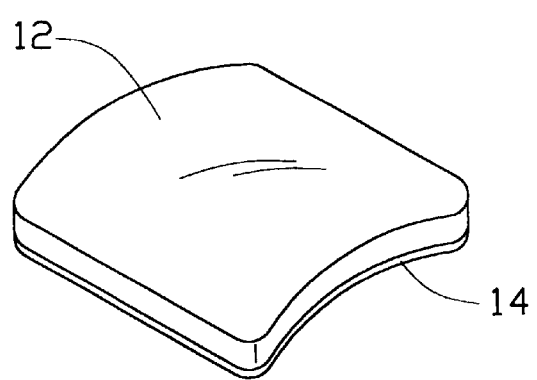

In FIG. 12, by attaching the filtering film 14 to the inner surface of the glass substrate 12, the protective lens 10 is completed.

From the above description, it is obvious that once the mold 20 is made, the filtering film 14 can be mass produced following the process shown in FIGS. 6–11. The lens 10 can similarly be mass produced. As the intervals between the ink stripes 16 are determined by the distances between the etched recesses 24 in the printing surface 26, they can be readily controlled by mean of the etching process. Therefore, the present invention can overcome the problems associated with conventional technology.

It will be apparent that many changes and modifications of the several features described herein may be made with departing from the spirit and scope of the invention. It is therefore apparent that the foregoing description is by way of illustration of the invention rather than limitation of the invention.

I claim:

1. A method for manufacturing a protective lens for a display, said method comprising the steps of:

forming a mold, the mold having a printing surface in which a plurality of recesses defines;

flooding the printing surface with ink so as to fill the recesses with the ink;

removing excess ink from the printing surface with a portion of the ink remained in the recesses;

positioning an elastically deformable body on the printing surface;

pressing the elastically deformable body against the printing surface so that the ink in the recesses is attached to a surface of the elastically deformable body;

providing a piece of membrane;

moving and positioning the elastically deformable body with the ink attached thereto on the membrane;

pressing the elastically deformable body against the membrane to transfer the ink to the membrane for forming ink stripes on the membrane to form a filtering film;

providing a transparent glass substrate;

attaching the filtering film to a surface of the glass substrate to form a protective lens.

2. The method as claimed in claim 1, wherein the recesses are formed by etching the printing surface.

3. The method as claimed in claim 1, wherein the glass substrate is arcuate.

4. The method as claimed in claim 3, wherein intervals between the recesses are unequal.

5. The method of claim 1 further comprising the steps of (a) making an additional filtering film and (b) attaching the additional filtering film to an opposite surface of the glass substrate whereby the additional filtering film is opposite to and corresponding to the filtering film.

6. The method as claimed in claim 5, the protective lens comprises a transparent glass substrate with a curved configuration, a filtering film attached to a surface of the glass substrate and a plurality of unequally spaced ink stripes being formed on the filtering film.

7. The method as claimed in claim 6, the ink stripes are distributed on the filtering film according to a predetermined pattern, symmetrically spaced from middle to opposite sides of the filtering film, and the pattern is designed such that light emitted from a source on a concave side of the glass substrate is blocked from transmission through the glass substrate by the ink stripes except in a narrow arc to either side of a line drawn normal to a center of the glass substrate.

8. A method for manufacturing a filtering film, said method comprising the steps of:

forming a mold, the mold having a printing surface in which a plurality of recesses defines;

flooding the printing surface with ink so as to fill the recesses with the ink;

removing excess ink from the printing surface with a portion of the ink remained in the recesses;

positioning an elastically deformable body on the printing surface;

pressing the elastically deformable body against the printing surface so that the ink in the recesses attaches to a surface of the elastically deformable body; providing a piece of membrane;

moving and positioning the elastically deformable body with the ink attached thereto on the membrane;

pressing the elastically deformable body against the membrane to transfer the ink to the membrane, thereby forming ink stripes on the membrane.

9. The method as claimed in claim 8, wherein the recesses are formed by etching the printing surface.

10. The method as claimed in claim 8, wherein intervals between the recesses are unequal.

11. A method of making a protective lens with a curved configuration thereof, comprising the steps of:

(1) providing a mold with a plurality of unequally spaced recesses therein;

(2) filling said recesses with printing ink;

(3) providing a piece of membrane with a configuration compliant with the protective lens;

(4) transferring the printing ink from the mold unto said membrane thus forming a filtering film thereof;

(5) providing a glass substrate; and (6) attaching the filtering film to the glass substrate thus forming the protective lens thereof.

12. The method as claimed in claim 11, wherein the recesses have different lengths.

13. The method as claimed in claim 11, wherein a distance between two adjacent outermost recesses is larger than that between two adjacent ones of the rest of said recesses.

14. The method as claimed in claim 11, wherein step (4) includes pressing a body against the mold to grasp the printing ink on said body, and then pressing the body against the membrane to leave the ink on the membrane.

15. The method as claimed in claim 14, wherein a pattern of ink strips is formed on the body after said body presses against the mold while before said body presses against the membrane.

16. The method as claimed in claim 15, wherein a distance between two adjacent outermost strips is larger than that between two adjacent ones of the rest of said strips.

* * * * *